United States Patent
Kneller et al.

[15] 3,704,972
[45] Dec. 5, 1972

[54] SELF-REGULATING EXTRUDER

[72] Inventors: Klaus Kneller, 8303 Nurensdorf; Daniel Poncet-Montange, 2900 Porrentruy; Jean-Louis Prost, 1205 Geneva; Jean Trub, 1212 Grand-Lancy/Geneva, all of Switzerland

[73] Assignee: Schweizerische Industrie-Gesellschaft, Neuhausen am Rheinfall, Switzerland

[22] Filed: May 3, 1971

[21] Appl. No.: 139,517

[30] Foreign Application Priority Data

May 8, 1970 Switzerland..................6860/70

[52] U.S. Cl. ..................425/145, 425/203, 259/191
[51] Int. Cl. ..............................B29f 3/02, B29f 3/03
[58] Field of Search......425/145, 149, 162, 203, 205, 425/208; 259/191, 193

[56] References Cited

UNITED STATES PATENTS

| 3,367,635 | 2/1968 | Gresch | 425/203 X |
| 3,599,292 | 8/1971 | Ronzoni et al. | 425/203 |

FOREIGN PATENTS OR APPLICATIONS

| 1,200,516 | 9/1965 | Germany | 425/208 |
| 211,311 | 2/1967 | Sweden | 425/203 |

Primary Examiner—R. Spencer Annear
Attorney—Karl F. Ross

[57] ABSTRACT

A screw-type extruder for plastic material has a cylindrical housing axially divided into two externally heated compartments provided at their upstream ends with a hopper and a venting aperture, respectively; at its downstream end each compartment terminates in a mobile housing section for adjustment of the back pressure prevailing therein and, consequently, of the flow rate of plastic mass discharged from the compartment. To equalize the two flow rates, a pair of hydraulic jacks serving to shift these mobile sections are controlled by respective regulators which respond to associated function generators and to the corresponding back pressure as measured just ahead of these mobile sections; the first function generator receives at its input the back pressure of the second compartment whereas the second function generator is adjusted to deliver a constant output dependent upon the desired flow rate at the extrusion nozzle and upon the speed of rotation of the screw.

7 Claims, 3 Drawing Figures

SELF-REGULATING EXTRUDER

Our present invention relates to an extruder for thermoplastic material which is fed by a continuously rotating screw to a nozzle at a discharge end of a generally cylindrical housing, the latter being heated to a temperature sufficient to fluidify the plastic mass for mastication and homogenization by the screw threads.

The heated plastic material in the extruder housing gives off vapors which must be discharged at a point well ahead of the nozzle so as to avoid the formation of gas occlusions in the extruder mass. It is therefore customary to provide the housing, at some intermediate point of its length, with a vent leading to the atmosphere or some other region of low pressure. The loss of substantial quantities of plastic material through the vent can be avoided by the provision of a restricted passage ahead of that vent which causes a drop of the internal housing pressure to substantially the atmospheric level. The part of the screw lying downstream of the vent is then used to build up that internal pressure to the value necessary for extrusion.

With the constriction near the vent effectively subdividing the interior of the housing into two axially adjoining compartments, it is important to make the flow rates at the output end of the two compartments (i.e. the amount of material discharged therefrom per unit of time) as nearly equal to each other as possible since any major or sustained disparity would either starve the nozzle or cause appreciable leakage through the vent.

It is, therefore, the general object of our present invention to provide means in such an extruder for equalizing the two flow rates under widely varying operating conditions.

A related object is to provide, in such an extruder, means for maintaining substantially constant delivery rate at the extruder nozzle.

For this purpose, pursuant to the present invention, we provide the extruder housing with a pair of mobile constriction elements at the downstream ends of the two aforementioned compartments, the first constriction being thus disposed at the junction of these compartments whereas the second one is located just ahead of the nozzle. The mobile constriction elements are individually displaceable be associated adjusters, e.g. of the fluid-operated type, under the control of a first and a second regular responding to the internal pressures measured by a pair of sensors just ahead of these constrictions; one of the regulators, preferably the first one, also receives a control voltage or other output variable from a function generator which responds to the internal pressure sensed at the other (second) constriction to establish a predetermined pressure relationship corresponding to equal flow rates.

As will be shown hereinafter, the two internal pressures $P_1$ and $P_2$ — i.e. the back pressures created at the first and second constrictions, respectively — bear a linear relationship depending on certain parameters which are normally invariant during an extruding operation, including the rotary speed of the feed screw and the viscosity of the plastic material (a function of temperature) in each of the two compartments. The function generator, therefore, may be initially adjusted in conformity with these several parameters and need not be readjusted as long as they do not change. A similar function generator may be used, pursuant to a further feature of our invention, to provide a reference value depending upon the desired delivery rate of the nozzle and the speed of rotation; the output of this latter function generator will generally be constant during a given extrusion operation.

The above and other features of our invention will be described in detail hereinafter with reference to the accompanying drawing in which.

Figure 3:
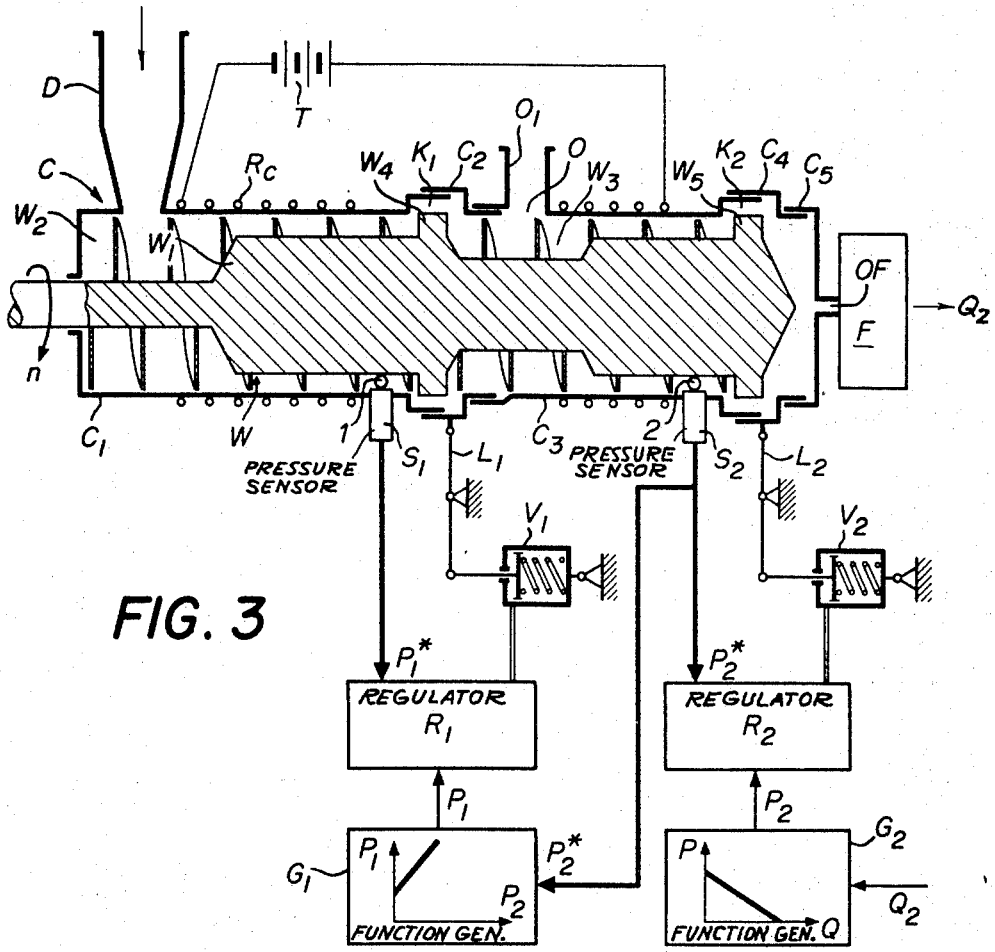
FIG. 3 is a diagrammatic view of an extruder according to the invention, shown in axial section, and associated elements.

Reference will first be made to FIG. 3 which shows a screw-type extruder with a generally cylindrical housing C having at left an inlet, in the form of a hopper D, for thermoplastic raw material continuously supplied in the form of powder or granules. Housing C is axially subdivided into five sections $C_1$, $C_2$, $C_3$, $C_4$ and $C_5$; sections $C_1$ and $C_3$, which are of substantially greater axial length then the others, are provided with external heating means here shown as a resistive wire coil $R_c$ energized by a source of current T. With the usual extrudable thermoplastic materials, the temperature maintained in the housing by this coil may range between about 300° and 400°C.

Cylinder section $C_2$ overlaps section $C_1$ with freedom of relative axial mobility and defines with it a first compartment ending in a constricted passage $K_1$, this passage being bounded internally by a peripheral annular shoulder $W_4$ of a stepped core $W_1$ of a feed screw W which is continuously rotated, at a constant speed $n$, by a motor not shown. In a similar manner, housing section $C_4$ movably overlaps section $C_3$ and defines with it a second compartment extending from passage $K_1$ to another constricted passage $K_2$ internally bounded by a peripheral annular shoulder $W_5$ of core $W_1$. Terminal section $C_5$, which is made rigid with sections $C_1$ and $C_3$ by nonillustrated tie members, has an outlet OF leading to a nozzle F replaceably mounted thereon. Screw W has a first set of threads $W_2$, extending from the upstream (left-hand) end of housing section $C_1$ to shoulder $W_4$, and a second set of threads $W_3$, extending from the corresponding end of housing section $C_3$ to shoulder $W_5$. It will be noted that the two stepped portions of core $W_1$ terminating in shoulders $W_4$ and $W_5$ have each a part of relatively small diameter remote from the respective shoulder and a part of relatively large diameter proximal thereto, thus causing a compaction of the fluid mass approaching the passages $K_1$ and $K_2$.

The axial displacement of mobile housing sections $C_2$ and $C_4$ can be brought about by a variety of adjusting mechanisms here schematically represented by a pair of levers $L_1$, $L_2$ which are connected to the spring-loaded pistons of a pair of hydraulic jacks $V_1$, $V_2$. The admission of operating fluid to these jacks is controlled by a pair of regulators $R_1$, $R_2$ each comprising, for example, a hydraulic valve electromagnetically shiftable by current from a power amplifier under the control of a voltage comparator. A first pressure sensor $S_1$, mounted in the housing wall just ahead of shoulder $W_4$, delivers the voltage analog of the internal pressure $P_1^*$, prevailing at a point 1 near the downstream end of the first compartment, to one input of regulator $R_1$ whose other input receives a variable reference voltage, i.e.

the analog of the pressure $P_1$ required at that point, from a function generator $G_1$. Similarly, a second pressure sensor $S_2$, mounted in the housing wall just ahead of shoulder $W_5$, delivers to one input of regulator $R_2$ the voltage analog of the internal pressure $P_2^*$ prevailing at a point 2 near the downstream end of the second compartment, the same analog voltage being also conveyed to the input of function generator $G_1$. Another function generator $G_2$ supplies the second input of regulator $R_2$ with the analog of the pressure $P_2$ which it is desired to establish at the point 2 for the maintenance of a given rate of discharge $Q_2$ of the plastic material from the nozzle F.

Housing section $C_3$ is provided, at the upstream end of the second compartment, with a vent O leading to a flue $O_1$ for the evaporation of volatile components evolving from the plastic mass advancing toward the nozzle F. In the vicinity of this vent, as well as in the region of hopper D, the internal housing pressure is substantially equal to atmospheric. Thus, the back pressure (in atmospheres) encountered by the moving mass in its travel through sections $C_1$ and $C_3$ corresponds substantially to $P_1 - 1$ and $P_2 - 1$, with $P_1$ and $P_2$ measured in absolute values.

In the illustrated idle position of jacks $V_1$ and $V_2$, levers $L_1$ and $L_2$ maintain the mobile cylinder sections $C_2$ and $C_4$ in their extreme right-hand positions for a maximum clearance at the two constricted passages $K_1$ and $K_2$. In the opposite limiting positions the flow through these passages may be completely blocked. During normal operation, the jacks will generally assume an intermediate position corresponding to a more or less throttled flow.

The flow rate $Q_2$ at the nozzle outlet equals that at the constricted passage $K_2$ and should also equal the flow rate $Q_1$ at passage $K_1$ if the extruder is to operate properly. It will be evident that some material would be forced out through the vent 0 if $Q_1 > Q_2$; on the other hand, if $Q_1 < Q_2$, insufficient material will reach the nozzle F via port OF so that the product will be unsatisfactory.

Figure 1:
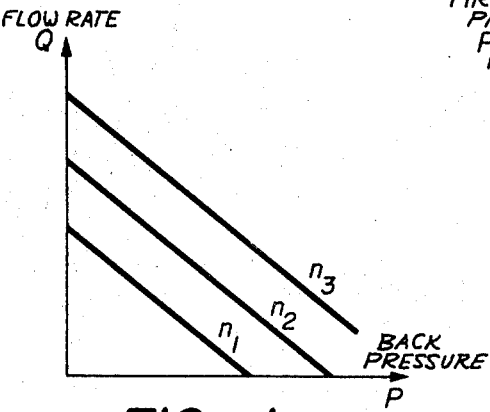
FIGS. 1 and 2 are two sets of explanatory graphs.

As is well known, the discharge rate Q of an extruder section as a function of back pressure P can be graphically represented by a straight line, as shown in FIG. 1, which has a negative slope and whose position with reference to the origin of the coordinate system depends on the speed of the feed screw; in FIG. 1 we have illustrated the characteristics Q(P) for three progressively higher speeds $n_1$, $n_2$ and $n_3$. This relationship holds true for the flow rate $Q_1$ in the first compartment as well as for the flow rate $Q_2$ and pressure $P_2$ in the second compartment.

It can be shown that the two back pressures $P_1$ and $P_2$ are related by the equation $$P_2 = A \cdot n \cdot \mu_2 + B \cdot P_1 \cdot (\mu_2/\mu_1)$$

where $A$ and $B$ are constants depending upon the geometry of the screw, $n$ is its speed of rotation, $\mu_1$ is the viscosity of the mass in the first compartment bounded by cylinder section $C_1$, and $\mu_2$ is the viscosity in the second compartment bounded by section $C_3$.

Figure 2:
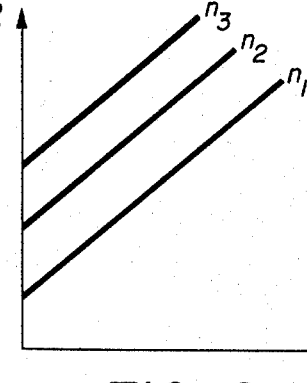

The foregoing relationship has been illustrated in FIG. 2 for the three speeds $n_1$, $n_2$ and $n_3$ which yield three parallel lines of positive slope intersecting the ordinate axis at different points; $\mu_1$ and $\mu_2$ are assumed to be invariant or at least to have a constant ratio.

Function generator $G_1$ is set to operate on one of the characteristics of FIG. 2 to supply the analog of pressure $P_1$ from the input variable $P_2^*$; function generator $G_2$, responding to an input voltage which is an analog of the selected output rate $Q_2$, operates on one of the graphs of FIG. 1 to deliver the analog of pressure $P_2$ to regulator $R_2$ in order to make $P_2^* \approx P_2$. As long as $n$ and $\mu_2$ are not changed, the generator output $P_2$ will be proportional to $Q_2$ and will be constant if $Q_2$ does not vary; in a simplified system, therefore, generator $G_2$ could be replaced by a preferably adjustable source of reference voltage representing the desired delivery rate $Q_2$.

The extruder according to our invention may operate with minimum supervision and can therefore be kept working around the clock, under widely varying conditions and with different temperatures, speeds, nozzle shapes and types of plastic material. Changes in extrusion pressure, e.g. as necessitated upon a substitution of nozzles, may be readily taken into account by a resetting of function generator $G_2$.

It will be apparent that the electrohydraulic control system described and illustrated is representative of a variety of equivalent arrangement not necessarily involving a translation of pressures into analog voltages. Jacks $V_1$ and $V_2$, for example, may be replaced by pneumatic or electromagnetic servomotors.

We claim:

1. An extruder for thermoplastic material, comprising:

a generally cylindrical housing axially subdivided into a first compartment and a second compartment, said first compartment having an upstream end provided with inlet means for the admission of raw material to be masticated, said second compartment having an upstream end adjacent the downstream end of said first compartment and provided with venting means for evolving gases;

heating means for said first and second compartments;

an extrusion nozzle adjoining the downstream end of said second compartment;

a rotatable feed screw axially traversing said housing from the region of said inlet means to the vicinity of said nozzle;

first mobile constriction means at the junction of said compartments for varying a first internal pressure developing at the downstream end of said first compartment upon a feeding of plastic mass by the rotating screw;

second mobile constriction means at the downstream end of said second compartment for varying a second internal pressure developing thereat;

first and second adjustment means for displacing said first and second mobile constriction means, respectively;

first and second sensing means at the downstream ends of said first and second compartments for measuring said first and second internal pressures, respectively;

first and second regulating means connected to said first and second sensing means for controlling said first and second adjustment means in response to said first and second internal pressures, respectively; and function-generating means with an input connection to one of said sensing means for delivering to one of said regulating means an output variable establishing a predetermined relationship of said internal pressures corresponding to equal flow rates of plastic mass discharged from said compartments.

2. An extruder as defined in claim 1 wherein the other of said regulating means has a reference input, further comprising a source of reference magnitude connected to said reference input.

3. An extruder as defined in claim 2 wherein said source of reference magnitude comprises a function generator establishing a pressure analog dependent upon the delivery rate of said nozzle and the speed of rotation of said screw.

4. An extruder as defined in claim 1 wherein said input connection extends to said sensing means, said one of said regulating means being said first regulating means.

5. An extruder as defined in claim 1 wherein said screw has a core formed with two peripheral annular shoulders respectively juxtaposed with said first and second mobile constriction means and defining two variable gaps therewith.

6. An extruder as defined in claim 5 wherein said core has two stepped portions ahead of said annular shoulders, respectively, each stepped portion having a part of relatively small diameter remote from the respective shoulder and a part of relatively large diameter proximal thereto.

7. An extruder as defined in claim 1 wherein said housing is provided with a restricted outlet leading from said second mobile partition to said nozzle.

* * * * *